(No Model.) 2 Sheets—Sheet 1.

C. J. A. SJOBERG.
ANTI FRICTION BEARING.

No. 462,744. Patented Nov. 10, 1891.

WITNESSES:

INVENTOR
C. J. A. Sjoberg
BY
F. W. Smith Jr.
ATTORNEY (No Model.) 2 Sheets—Sheet 2.
C. J. A. SJOBERG.
ANTI FRICTION BEARING.
No. 462,744. Patented Nov. 10, 1891.
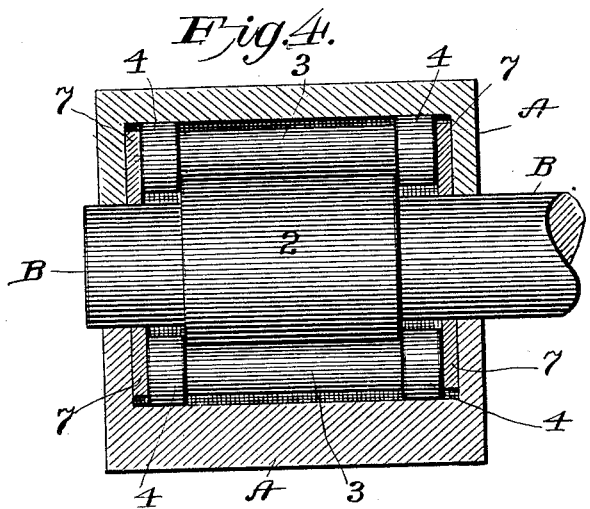
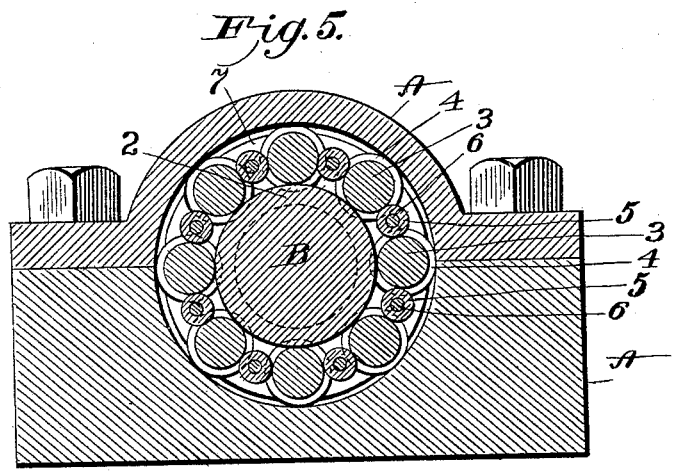
WITNESSES:
J. Finch,
S. S. Williamson.
INVENTOR
C. J. A. Sjoberg
BY F. W. Smith Jr.
ATTORNEY

UNITED STATES PATENT OFFICE.

CARL J. A. SJOBERG, OF BROOKLYN, NEW YORK, ASSIGNOR TO MATHILDE C. SJOBERG, OF SAME PLACE.

ANTI-FRICTION BEARING.

SPECIFICATION forming part of Letters Patent No. 462,744, dated November 10, 1891.

Application filed March 12, 1891. Serial No. 384,726. (No model.)

*To all whom it may concern:*

Be it known that I, CARL J. A. SJOBERG, a citizen of the United States, residing at Brooklyn, in the county of Kings and State of New York, have invented certain new and useful Improvements in Anti-Friction Bearings; and I do hereby declare the following to be a full, clear, and exact description of the invention, such as will enable others skilled in the art to which it appertains to make and use the same.

My invention relates to certain new and useful improvements in anti-friction bearings for journals and journal-boxes, and has for its object to reduce the friction to a minimum, and, furthermore, to provide devices for carrying out my invention which shall be readily assembled in operative position.

Figure 1:
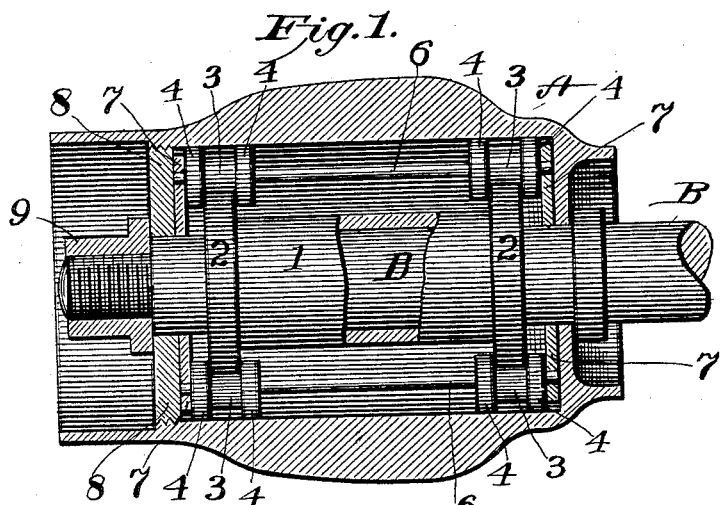
Figure 2:
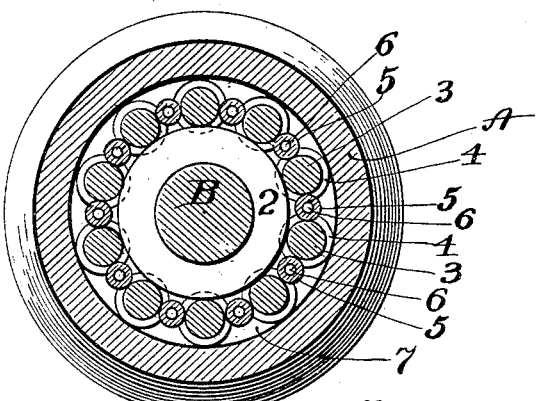
Figure 3:
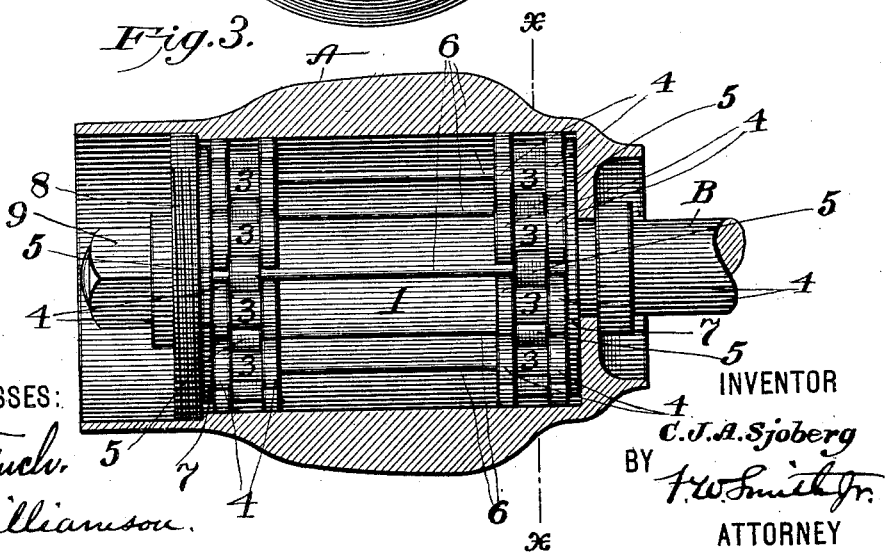

In the accompanying drawings, in Figures 1, 2, and 3, I have shown my invention applied in connection with the hub and axle of a vehicle, while in Figs. 4 and 5 I have shown an ordinary machine-bearing equipped with my improvement.

Fig. 1 is a sectional elevation of a vehicle hub and axle provided with my improvement; Fig. 2, a section at the line $x\ x$ of Fig. 3; Fig. 3, a view similar to Fig. 1, but showing all the parts except the hub in elevation; Fig. 4, a sectional elevation of an ordinary journal-box and shaft equipped with my improvement; Fig. 5, a vertical cross-section through said box.

Similar letters and numerals denote like parts in the several figures of the drawings.

Prior to my invention it has been common to use ball-bearings for shafts and axles; but, the balls being in contact with each other and with the stationary bearing, the rotation imparted to said balls by the revolving bearing is opposed by the action of the balls on each other and also by the resistance afforded by the stationary bearing; also, the length of the circumference of the journal being less than that of the circumference of the journal-box and the balls being of uniform size, it follows that the outer circumference of the balls will have to travel throughout a longer circuit than the inner circumferences, the result being that the balls will drag on the journal and cause great friction. To this fact is due the frequent grinding and breaking of the balls. The resistance afforded by the stationary bearing itself is comparatively small, and if the friction were not so great between the balls themselves the latter would form a far better bearing. It is the aim of my invention to overcome this disadvantage and to relieve the bearing-rolls of any intermediate friction.

Referring to Fig. 1, A is the vehicle-hub, and B the axle. Around the axle is a sleeve 1, having collars 2 rigid therewith. 3 are rolls around the peripheries of said collars and having flanged sides 4, which embrace the collars and bear against the inner wall of the hub, whereby a rotary bearing is afforded between said hub and collars. These rolls are perfectly free to revolve axially and also to travel around the collars. Between these rolls and within the flanged sides are small rolls 5, loosely mounted on spindles 6, which latter are supported within disks 7 at the ends of the hub. These disks are loosely assembled around the axle B and have no contact with the hub. The small rolls 5 have no contact with any of the parts except the rolls 3, and the main function of said rolls 5 is to separate the rolls 3 without interposing any frictional resistance.

8 is a screw-cap which closes the outer end of the hub, and 9 the usual nut on the outer end of the axle, whereby the latter is properly secured.

The hub may be partly filled with oil in order to afford a suitable lubrication.

The circumferences of the rolls 3 and flanged sides 4 are such with respect to the circumferences of the bearings on the journal and journal-box that said rolls and sides make the same number of revolutions in completing the circuit of said journal and box, and therefore there is no drag whatever on the part of the rolls. In other words, the rolls 3 have two diameters—one for the journal and the other for the journal-box. It will thus be seen that my invention preserves all the advantages of a ball-bearing and does away with the disadvantages thereof, for there is no friction whatever between the rolls themselves.

My invention may be applied in the instance of any bearing, and it is immaterial whether the collars 2 are rigid or loose on the shaft or axle. In Fig. 1 the sleeve is loose on the axle and the collars tight on the sleeve, because, the hub being a closed bearing, it would be impossible to apply my improvement without first assembling the various parts and then introducing them around the axle within the hub. A machine-bearing is, on the other hand, open, and I prefer to have the collar rigid on the shaft.

In the construction shown at Fig. 4 a single collar is shown and one series of rolls 3 and 5 employed around said collar.

I claim—

1. In an anti-friction bearing, the combination, with the journal and journal-box, of the loose rolls 3, bearing circumferentially on said journal and having flanged sides 4, which bear against said box, disks 7 at the ends of said box, spindles 6, supported within said disks, and small rolls 5, carried by said spindles and extending within the sides 4 between the individual rolls 3, said rolls 5 having contact only with the rolls 3, substantially as set forth.

2. In an anti-friction bearing, the combination, with the journal-box and the journal, of the collars 2 around said journal, rolls 3 around said collars and having flanged sides which embrace the latter, and rolls 5, interposed between the rolls 3 within said flanged sides and having peripheral contact only with said rolls 3, substantially as shown and described.

3. In an anti-friction bearing, the combination, with the journal and journal-box, of a series of rolls around said journal and having different diameters to afford bearings against the journal and journal-box, whereby said rolls will complete the circuit of the journal-box and journal with no drag on the latter, and a second series of rolls between the individual rolls of the first series and having no contact except with the latter, substantially as set forth.

In testimony whereof I affix my signature in presence of two witnesses.

CARL J. A. SJOBERG.

Witnesses:
   F. W. SMITH, Jr.,
   CHAS. E. SMITH.